(12) United States Patent
Brandt

(10) Patent No.: US 6,816,083 B2
(45) Date of Patent: Nov. 9, 2004

(54) ELECTRONIC DEVICE WITH COVER INCLUDING A RADIO FREQUENCY INDENTIFICATION MODULE

(75) Inventor: Jan Brandt, Turku (FI)

(73) Assignee: Nokia Corporation, Espoo (FI)

( * ) Notice: Subject to any disclaimer, the term of this patent is extended or adjusted under 35 U.S.C. 154(b) by 5 days.

(21) Appl. No.: 10/061,164

(22) Filed: Feb. 4, 2002

(65) Prior Publication Data

US 2003/0146821 A1 Aug. 7, 2003

(51) Int. Cl.7 .............................................. G08C 19/04
(52) U.S. Cl. ............................... 340/870.11; 340/572.8; 379/102.02; 379/433.11; 379/428.04; 379/428.01; 379/10.1; 705/16
(58) Field of Search ...................... 340/870.11, 572.2, 340/572.4, 572.8, 10.4, 10.1, 10.5; 379/102.02, 428.01, 433.11, 428.04; 705/16

(56) References Cited

U.S. PATENT DOCUMENTS

| | | |
|---|---|---|
| 3,298,558 A | 1/1967 | Nichol |
| 3,713,148 A | 1/1973 | Cardullo et al. |
| 4,189,712 A | 2/1980 | Lemelson |
| 4,330,578 A | 5/1982 | Nishihira et al. |
| 4,495,125 A | 1/1985 | Hatakeyama et al. |
| 4,823,928 A | 4/1989 | Speas |
| 4,880,097 A | 11/1989 | Speas |
| 4,885,663 A | 12/1989 | Parker |
| 4,994,224 A | 2/1991 | Itoh et al. |
| 5,005,108 A | 4/1991 | Pristash et al. |
| 5,053,774 A | 10/1991 | Schuermann et al. |
| 5,138,650 A | 8/1992 | Stahl et al. |
| 5,363,294 A | 11/1994 | Yamamoto et al. |
| 5,382,952 A | 1/1995 | Miller |
| 5,453,747 A | 9/1995 | D'Hont et al. |
| 5,488,376 A | 1/1996 | Hurta et al. |
| 5,489,773 A | 2/1996 | Kumar |
| 5,528,222 A | 6/1996 | Moskowitz et al. |
| 5,602,919 A | 2/1997 | Hurta et al. |
| 5,604,485 A | 2/1997 | Lauro et al. |
| 5,614,892 A | 3/1997 | Ward, II et al. |
| 5,710,886 A | 1/1998 | Christensen et al. |
| 5,719,918 A | 2/1998 | Serbetciouglu et al. |
| 5,727,153 A | 3/1998 | Powell |
| 5,729,697 A | 3/1998 | Schkolnick et al. |
| 5,768,370 A | 6/1998 | Maatta et al. |
| 5,787,174 A | 7/1998 | Tuttle |
| 5,805,082 A * | 9/1998 | Hassett ........................ 340/928 |

(List continued on next page.)

FOREIGN PATENT DOCUMENTS

| | | |
|---|---|---|
| EP | 1109380 A2 | 6/2001 |
| JP | 04083447 | 3/1992 |
| JP | 10134960 | 5/1998 |
| WO | WO 97/12414 | 4/1997 |

(List continued on next page.)

OTHER PUBLICATIONS

Webster's II new Riverside university dictionary 1988, p. 430.*
"Mobil Speedpass Warning Card";User Manual.
"A Whitepaper"; BiStatix Technology; Motorola Inc.—Worldwide Smardcard Solutions Division.

(List continued on next page.)

Primary Examiner—Albert K. Wong
(74) Attorney, Agent, or Firm—Antonelli, Terry, Stout & Kraus, LLP

(57) ABSTRACT

A cover member for an electronic device, the cover member having a secure radio frequency identification (RFID) module within it, an electronic device including such a cover member, and a system including such an electronic device for authorizing providing of goods or services. If desired, the circuitry of the electronic device can supplement that of the RFID module, enabling storage, display and control of transactions enabled by the RFID module.

72 Claims, 5 Drawing Sheets

U.S. PATENT DOCUMENTS

| | | | |
|---|---|---|---|
| 5,819,234 | A | 10/1998 | Slavin et al. |
| 5,845,259 | A | 12/1998 | West et al. |
| 5,848,152 | A | 12/1998 | Slipy et al. |
| 5,850,599 | A | 12/1998 | Seiderman |
| 5,887,266 | A | 3/1999 | Heinonen et al. |
| 5,895,115 | A | 4/1999 | Parker et al. |
| 5,909,176 | A | 6/1999 | Schrott et al. |
| 5,933,086 | A | 8/1999 | Tischendorf et al. |
| 5,942,985 | A | 8/1999 | Chin |
| 5,943,624 | A | 8/1999 | Fox et al. |
| 5,969,691 | A | 10/1999 | Myers |
| 5,987,438 | A | 11/1999 | Nakano et al. |
| 5,989,480 | A | 11/1999 | Yamazaki |
| 6,016,038 | A | 1/2000 | Mueller et al. |
| 6,058,304 | A | 5/2000 | Callaghan et al. |
| 6,073,840 | A | 6/2000 | Marion |
| 6,075,971 | A | 6/2000 | Williams et al. |
| 6,078,806 | A | 6/2000 | Heinonen et al. |
| 6,078,820 | A | 6/2000 | Wells et al. |
| 6,079,838 | A | 6/2000 | Parker et al. |
| 6,107,920 | A | 8/2000 | Eberhardt et al. |
| 6,107,934 | A | 8/2000 | Andreou et al. |
| 6,117,384 | A | 9/2000 | Laurin et al. |
| 6,137,221 | A | 10/2000 | Roitman et al. |
| 6,150,774 | A | 11/2000 | Mueller et al. |
| 6,166,496 | A | 12/2000 | Lys et al. |
| 6,211,626 | B1 | 4/2001 | Lys et al. |
| 6,229,259 | B1 | 5/2001 | Christensen, Sr. |
| 6,244,911 | B1 * | 6/2001 | Heim .................. 439/862 |
| 6,292,901 | B1 | 9/2001 | Lys et al. |
| 6,456,039 | B1 * | 9/2002 | Lauper et al. .......... 320/107 |

FOREIGN PATENT DOCUMENTS

| | | |
|---|---|---|
| WO | WO 97/32423 | 9/1997 |
| WO | WO 98/28831 | 7/1998 |
| WO | WO 98/37524 * | 8/1998 |
| WO | WO 98/59510 * | 12/1998 |
| WO | WO 99/53457 | 10/1999 |
| WO | WO 00/10144 | 2/2000 |
| WO | WO 00/16285 | 3/2000 |
| WO | WO 00/21032 | 4/2000 |
| WO | WO 00/26838 | 5/2000 |
| WO | WO 00/26856 | 5/2000 |
| WO | WO 00/34931 | 6/2000 |
| WO | WO 00/38340 | 6/2000 |
| WO | WO 200079771 * | 12/2000 |
| WO | WO 01/03040 | 1/2001 |

OTHER PUBLICATIONS

"C–Stores Advance Technology"; E–Payments 2000; pp 12 A & 13A; Jun. 1999.

"From Present to Future. Or: Why the SkiData ticket technology is a secure future investment."; SkiData AG—EventAccess—Ticket Technologies; Jul. 13, 2000; pp 1,2; http://www.skidata.com/English/Event/Tickets.asp.

"From Selling to Charging; Or How to integrate technological highlights with SkiData components.";SkiData AG—Access Components—From selling to charging; Jul. 13, 2000; pp 1,2; http://www.skidata.com/English Components/KevDetector.asp.

"RFID: The retail revolution"; Checkpoint Systems—RFID Products; Jul. 21, 2000; pp 1 of 1; http://www.checkpoint-systems.com/rfid/products.html.

Maney, K.; "High–tech tags mean day of bar codes may be numbered"; WSSD: BiStatix: News Articles; Nov. 3, 2000; pp 1,2; USA Today; Mar. 31, 1999; http://www.motorola.com/GSS/SSTG/smartcard/3 6 bst news usa 3 31 99.html.

* cited by examiner

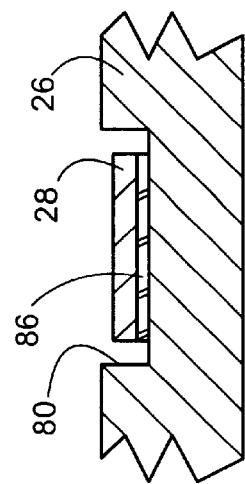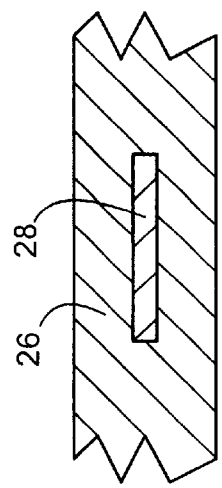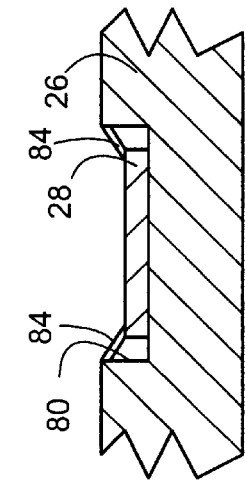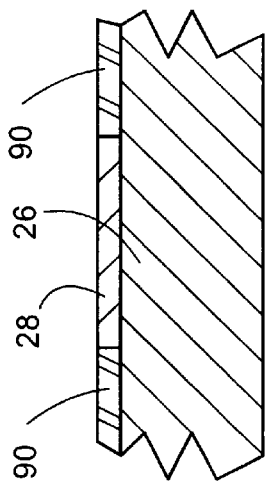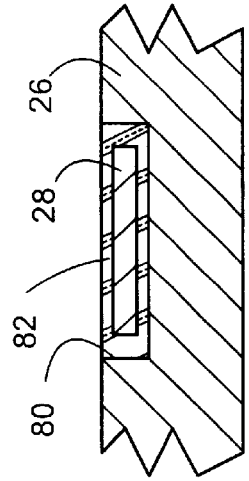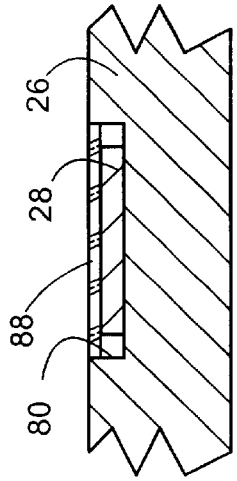

ELECTRONIC DEVICE WITH COVER INCLUDING A RADIO FREQUENCY INDENTIFICATION MODULE

FIELD OF THE INVENTION

The present invention pertains to a cover for an electronic device, the cover including a radio frequency identification ("RFID") module or transponder. The present invention also pertains to an electronic device having such a cover and to a system for providing goods and services to a person having an electronic device with such a cover.

BACKGROUND OF THE INVENTION

RFID modules incorporated into key fobs, wallet size cards, and other such items are frequently used to authorize the charging of the cost of goods and services to a charge account of a person using the RFID module. By way of example, key fobs with RFID modules are utilized to authorize the charging of gasoline. Such RFID modules are disclosed in, for example, U.S. Pat. No. 5,528,222, the disclosure of which is incorporated herein by reference, and are also discussed at, for example, the Internet web site http://www.speedpass.com. Such a RFID module can interact with a fueling system such as described in U.S. Pat. No. 6,073,840 to authorize the charging of the cost of gasoline to a credit card account of the person owning the RFID module.

The RFID module, however, does not provide the user with a record of the transactions that have been charged. Consequently, the user may be unable to recall the number of purchases charged, the cost of each purchase, or the total amount that he or she has charged. This can present problems if the user wishes to prepare a report on expenses incurred over a period of time or if the user wishes to determine the accuracy of the charge account statement when it is received. In addition, a small key fob is easy to lose. If the key fob is attached with the ignition key of a motor vehicle, for example, then in order to use the RFID module, the vehicle motor must be shut off and the key removed from the ignition switch, which is inconvenient and time consuming.

SUMMARY OF THE INVENTION

The present invention is a cover for an electronic device, the cover including a RFID module to enable the user to authorize charging of the cost of goods or services to a charge account of the user. In one embodiment, the RFID module is connectable to components within the electronic module to enable the electronic module to receive, store and display data regarding the transaction, as well as to control of the transaction if desired. No separate program card or smart card is required. The RFID module can not be removed from the cover without damaging the cover, thus providing security. Covers can be interchangeable so that, if desired, a cover can be removed from an electronic device and replaced by another such cover, thus authorizing charges to be made to a different charge account. Minimal space is required for the RFID module, and so the electronic device size is not significantly altered by incorporation of the RFID module.

BRIEF DESCRIPTION OF THE DRAWINGS

These and other aspects and advantages of the present invention are more apparent from the following detailed description and claims, particularly when considered in conjunction with the accompanying drawings. In the drawings:

Figure 4:
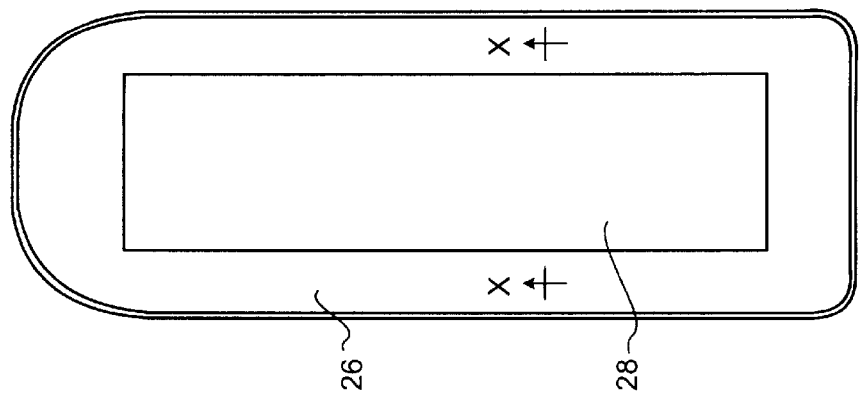
FIG. 4 is a plan view of the under side of the device cover of FIG. 3.
Figure 11:
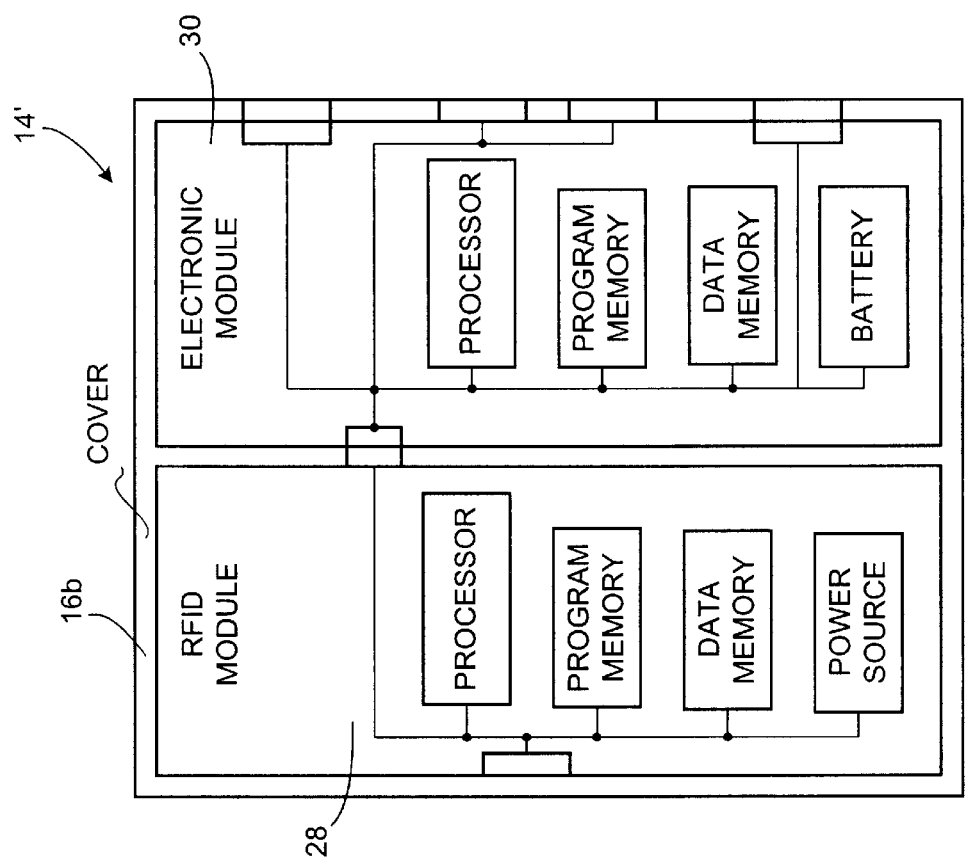
Figure 12:
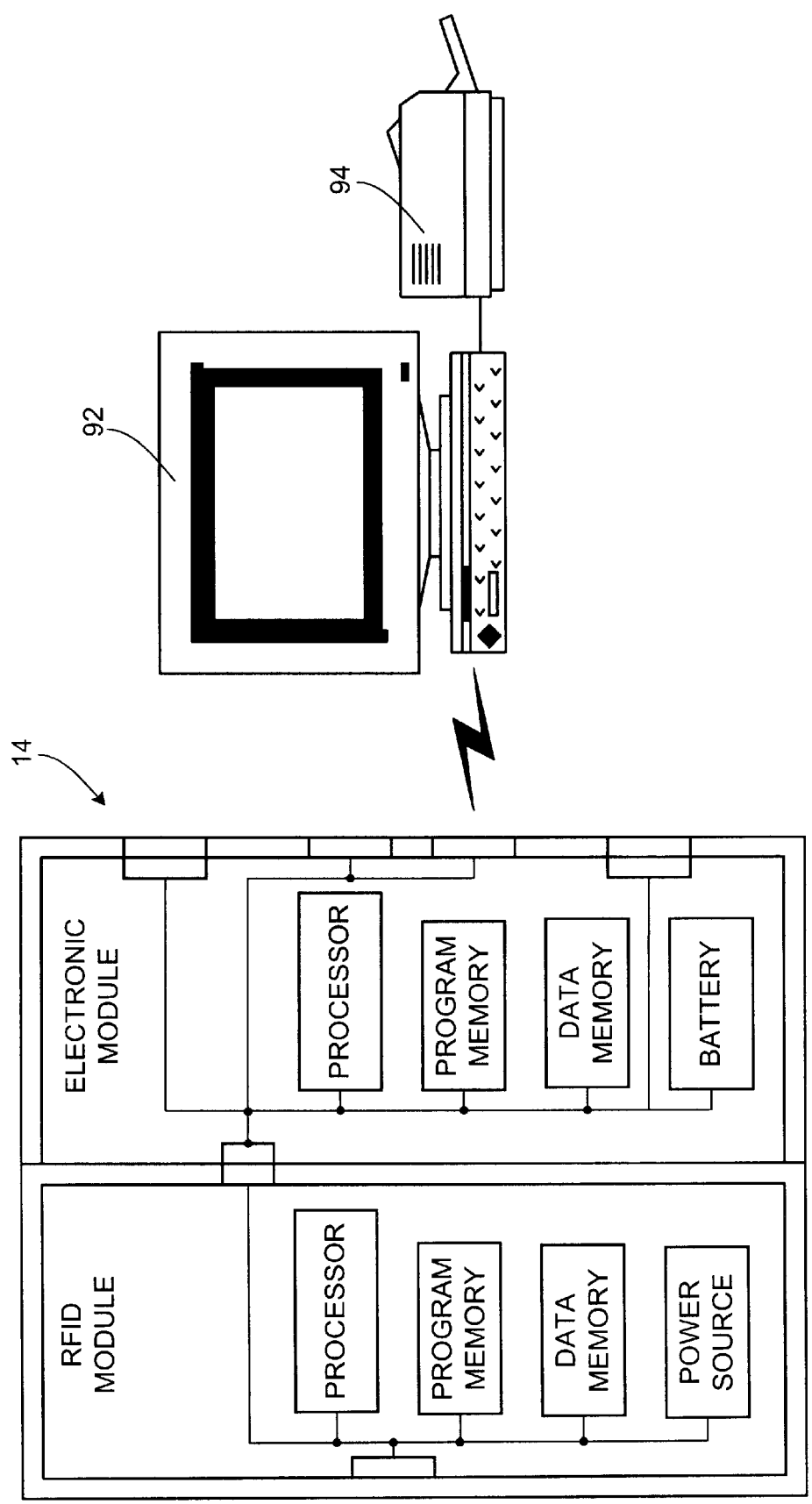

Each of FIGS. 5–10 is a sectional view taken along line X—X in FIG. 4 and depicts an alternative embodiment of a device cover in accordance with the present invention;

FIG. 11 is a block diagram of an electronic device in accordance with another embodiment of the present invention; and FIG. 12 is a block diagram of an electronic system for downloading data from an electronic device in accordance with an embodiment of the present invention.

DETAILED DESCRIPTION OF PREFERRED EMBODIMENTS

In the following description of various embodiment of the present invention, reference is made to the accompanying drawings which form apart hereof and in which are shown by way of illustration various embodiments in which the invention may be practiced. It is to understood that other embodiments may be utilized, and that structural and functional modifications may be made without departing from the scope of the present invention. In particular, while the following detailed description makes reference to the electronic device as a cellular telephone, other embodiments of electronic devices might also be provided in accordance with the invention.

Figure 1:
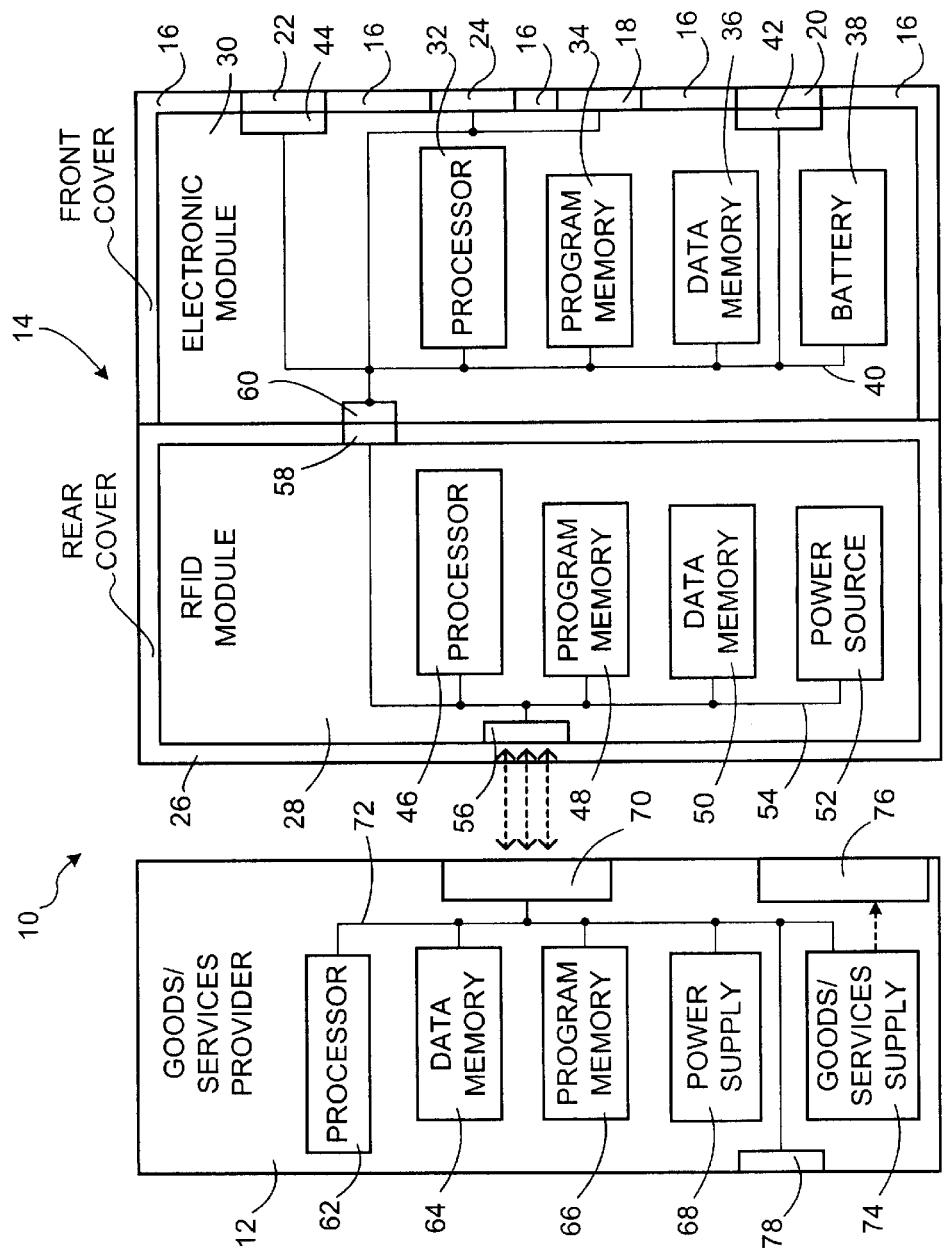
FIG. 1 is a block diagram of a system for providing goods or services utilizing an electronic device having a device cover in accordance with a preferred embodiment of the present invention.

FIG. 1 is a block diagram of a system 10 for providing goods or services in accordance with an illustrative embodiment of the present invention. The system includes a goods or services provider 12 which, by way of example, might be a gasoline pump at a gasoline service station, a parking meter controlling parking in a parking space, a payment window at a drive-through restaurant, a payment counter at any retail sales establishment for either goods or services, or any such goods or services provider. System 10 further includes an electronic device 14 having a front cover 16 and a rear cover 26. Covers 16 and 26 of electronic device 14 might be of a plain color, patterned, or clear, as desired.

Figure 2:
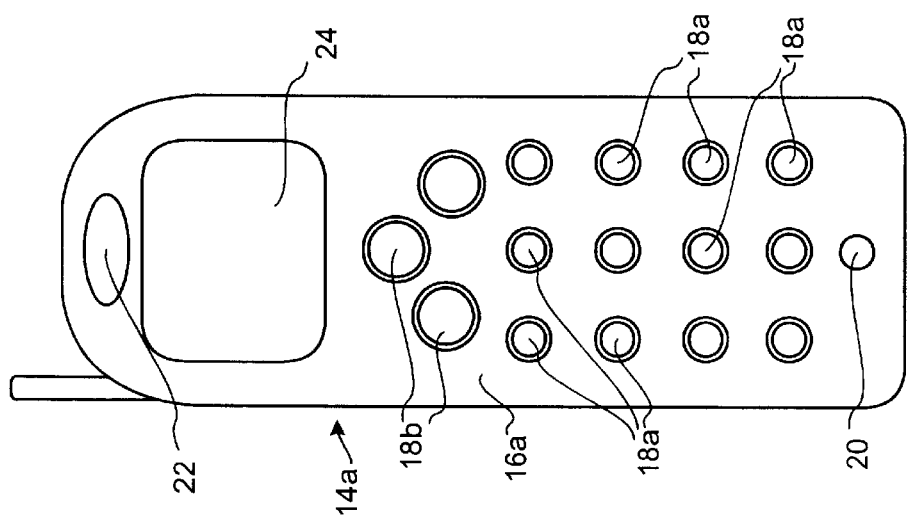
FIG. 2 is a plan view of a typical electronic device that might be provided with a device cover in accordance with the present invention.

FIG. 2 illustrate a cellular telephone 14a which is typical of the types of electronic devices 14 which can incorporate the present invention. Cellular telephone 14a includes a front cover 16a having a number of openings through which a number of controls extend. FIG. 2 illustrates the controls of cellular telephone 14a as including alphanumeric keys 18a which are used to "dial" a telephone number to which a call is to be made and control keys 18b to control other functions. Cellular telephone 14a also has a microphone 20 and a speaker 22, permitting two-way conversation. Preferably also, cellular telephone 14a has a display unit 24 for displaying data such as a telephone number to which a call is being placed.

Figure 3:
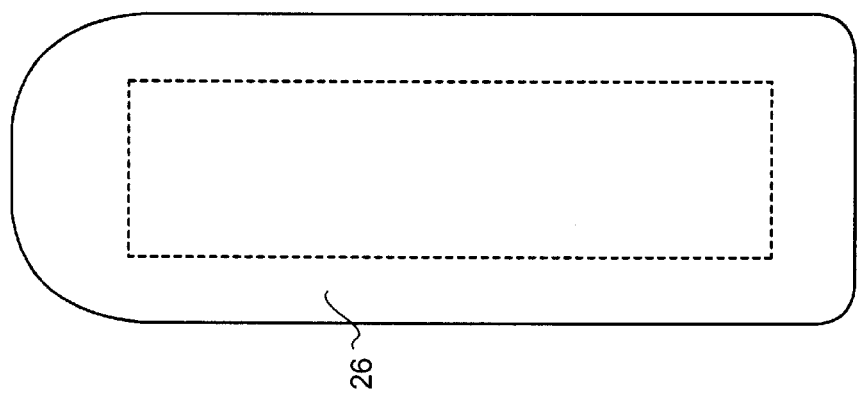
FIG. 3 is a plan view of the outer side of a device cover in accordance with a preferred embodiment of the present invention.

FIG. 3 is a plan view of the outside of an illustrative embodiment of a rear cover 26a for cellular telephone 14a, while FIG. 4 is a plan view of the inside of the rear cover 26a. A RFID module 28 is affixed to the inner surface of rear cover 26a.

As seen in FIG. 1, an electronic module 30 is enclosed within front cover 16 of electronic device 14. In the illustrative example of FIG. 1, electronic module 30 includes a processor 32, a program memory 34, a data memory 36 and a power source such as a battery 38, all of which are connected together by a power and signal bus 40. In addition, bus 40 is connected to control unit 18 of the controls 18a, 18b, a microphone 42 which is adjacent opening 20 in front cover 16, a loud speaker 44 which is adjacent opening 22 in the front cover, and display unit 24.

In the illustrative embodiment of FIG. 1, RFID module 28, within rear cover 26, includes a second processor 46, a second program memory 48, a second data memory 50, and a power source 52, all of which are joined together by power and data bus 54. Bus 54 also is connected to an input/output unit 56 which, by way of example, might be an antenna. If desired, bus 54 may be connected to a connector 58 which mates with a connector 60 that is connected to bus 40 within electronic module 30, enabling data to pass from RFID module 28 to electronic module 30.

In the illustrative embodiment of FIG. 1, goods/services provider 12 includes a processor 62, a data memory 64, a program memory 66, a power supply 68 and an input/output unit 70, all of which are connected together by a power and data bus 72. In the illustrative embodiment of FIG. 1, goods/services provider 12 further includes a goods/services supply unit 74 which is also connected to power and data bus 72 and which is positioned adjacent an outlet 76 to discharge goods or services.

Electronic module 30 is configured to perform a particular electronic function, and processor 32 and program memory 34 within electronic module 30 are adapted for the particular electronic function. Thus, if electronic device 14 is a cellular telephone, then program memory 34 stores the necessary programs for operation of the cellular telephone. Data memory 36 stores relevant telephone data, such as an automatic dialing directory or identification of telephone numbers which placed an unanswered call to the cellular telephone. Such cellular telephones are well known in the art.

Program memory 48 within RFID module 28 stores the necessary program to permit proper operation of the RFID module. Data memory 50 stores identification data for the RFID module. By way of examples each program memory 34, 48, and 66 might be a read only memory (ROM), and each data memory 36, 50, and 64 might be a random access memory (RAM).

Similarly, goods/services provider 12 is configured for operation based on the particular goods or services to be provided. By way of example, if goods/services provider 12 is a gasoline pump at a gasoline service station, then program memory 66 stores the necessary programs to enable receipt of payment information, authorization for dispensing of gasoline, and control of dispensing of the gasoline. In such case, goods/services supply 74 is the gasoline storage tank, while outlet 76 is the gasoline pump hose and nozzle. Similarly, if goods/services provider 12 is any other type of vending machine, for example a machine vending canned beverages, then goods/services supply 74 is a supply of the canned beverages or other goods to be dispensed through outlet 76. Alternatively, goods/services provider 12 might be, for example, a parking meter. Program memory 66 then stores a program to indicate the parking time for which payment has been authorized by RFID module 28 and to count down the authorized parking time as time passes, while goods/services supply 74 is a display device displaying the amount of time remaining for parking, and outlet 76 is a window through which the display can be seen. Likewise, goods/services provider 12 might be a transportation system, such as a subway in a metropolitan area or such as a railway, with goods/services supply 74 dispensing a fare card or ticket. As another example, goods/services provider might be a drive-through restaurant, in which event goods/services supply 74 is a display indicating approval of an authorization to charge the food that the user of electronic device 14 has ordered to the user's charge account, while outlet 76 is a window at which an attendant provides the ordered food to the user. As a further example, goods/services provider 12 might be a retail store, such as a grocery store, at which electronic device 14 is used to charge the total amount for purchases to a charge account of the device user.

In accordance with a program stored within program memory 66, processor 62 causes input/output unit 70 to output an interrogation signal periodically, for example at intervals of 1 ms. When the user of electronic device 14 wishes to obtain goods or services from provider 12, the user positions electronic device 14 so that its input/output unit 56 is adjacent input/output unit 70 of goods/services provider 12. By way of example, input/output units 56 and 70 might be antennas permitting communication of data between goods/services provider 12 and electronic device 14 as RFID modules 28 moves through the electromagnetic field emitted from the goods/services provider. In response to the interrogation signal received by input/output unit 56, processor 46 within RFID module 28, under the control of a program stored within program memory 48, causes input/output unit 56 to output identification data identifying electronic device 14 as authorizing the transaction. Upon receipt of that identification data, goods/services provider 12 determines whether electronic device 14 is acceptable for authorization of the transaction. This might be done by interrogating data stored within data memory 64 or by transmitting the data to a remote database over a connection 78 such as a telephone line or a global communication system, for example the Internet, to determine whether RFID module 28 is associated with a charge account meeting predetermined criteria such as having a sufficient available balance in a credit account to which the purchase price is to be charged or in a bank account from which the purchase price is to be debited. If desired, the user can be required to provide a personal identification number (PIN) through controls such as controls 18a to verify his or her identification, particularly if electronic device 14 is used to make payment by debiting an account at a bank or elsewhere. If a quantity of goods or services is required, such as the time for which parking is to be paid at a parking meter, processor 62 can transmit an appropriate request for input of quantity data, and the request can be transmitted through input/output units 70 and 56 and displayed on display unit 24. The user then can utilize a control on control unit 18 to indicate the desired quantity, and that information is transmitted through connectors 58 and 60 and input/output units 56 and 70 to processor 62. When authorization is accepted, processor 62 causes goods/services supply 74 to dispense the goods or services through outlet 76.

Power source 52 within RFID module 28 might be a reactive circuit that is responsive to the interrogation signal to derive and store voltage. Such a circuit is disclosed in, for example, U.S. Pat. No. 3,713,148, the disclosure of which is incorporated herein by reference, and might include, for example, an inductive coil, rectifying circuitry, a storage capacitor, and related circuitry permitting movement of RFID module 28 through the electromagnetic field from goods/services provider 12 to result in storage on the capacitor of sufficient voltage to power desired operation of the RFID module. Alternatively, power source 52 might be a second battery.

FIGS. 5–10 depict illustrative examples of the manner in which RFID module 28 might be affixed to cover member 26. By way of example, a solid state circuit or chip including processor 46, memories 48 and 50, power source 52, bus 54 and an antenna which serves as input/output unit 56 can be laminated into a plastic foil to provide module 28. In the illustrative embodiment of FIG. 5, module 28 is affixed within a recess 80 in the inner surface of cover member 26 by means of a solid fixing material 82. By way of example, if cover member 26 is formed of a molded plastic material, the fixing material can be that same plastic material that is inserted into recess 80 in a molten state to surround module 28 and is then allowed to solidify. FIG. 6 depicts a modified embodiment in which the fixing material 84 bridges the edges of module 28 to the edges of recess 80. In the illustrative embodiment of FIG. 7, RFID module 28 is affixed within recess 80 by an adhesive 86, for example, either a flowable adhesive that is allowed to solidify or a tape. FIG. 8 depicts an illustrative embodiment in which module 28 is affixed within recess 80 by means of a recess cover 88 that is positioned over module 28 to cover the recess. Recess cover 88 might be affixed to cover member 26, for example, by sonic or other welding or by a fixing material or an adhesive. In the illustrative embodiment of FIG. 9, RFID module 28 is incorporated within a foil 90 which is then laminated onto the inner surface of cover member 26 which acts as a base for the lamina. In the illustrative embodiment of FIG. 10, RFID module 28 is molded within cover member 26 during the manufacture of the cover member. Various other manners of affixing RFID module 28 to cover member 26 might also be utilized.

If desired, processor 46 and power source 52 can be omitted from RFID module 28, and instead program memory 48, data memory 50 and input/output unit 56 can be connected to processor 32 and battery 38 through connectors 58 and 60. Nevertheless, program memory 48 and data memory 50 assure that the RFID data is securely retained within cover member 26.

The embodiment of FIG. 1 depicts separate cover members 16 and 26. FIG. 11 illustrates an alternative embodiment of an electronic device 14' in which a single cover member 16b encloses both RFID module 28 and electronic module 30.

When electronic device 14 is utilized to authorize a transaction at goods/services provider 12, the goods/services provider can transmit to RFID module 28 data concerning the transaction, for example the total price and the description and quantity of the goods or services for which payment has been made. This transaction data might be stored within data memory 50 of RFID module 28 or within data memory 36 of electronic module 30. The transaction data can be displayed on display device 24 so that the user of electronic device 14 is aware of the transaction data. The user can input control commands by means of control unit 18. In addition, as illustrated in FIG. 12, at a later time the transaction data might be downloaded either via a wireless connection or a wired connection from electronic device 14 to a device such as a personal computer 92 within which extensive data records can be maintained. Further, the transaction data might then be printed out by means of a printer 94.

The present invention thus provides a cover member for an electronic device, the cover member having a secure RFID module within it. In particular embodiments, the circuitry of the electronic device can supplement that of the RFID module, enabling storage, display and control of transactions enabled by the RFID module. Although the invention has been described with reference to particular embodiments, various alternations, rearrangements, and substitutions can be made, and still the result would be within the scope of the invention.

What is claimed is:

1. A device, comprising:

first and second outer cover parts which enclose an electronic module and a radio frequency module by the parts fitting together, the electronic module including a battery;

the radio frequency identification module being placed between the electronic module and one of said cover parts, an input/output unit incorporated within one of said parts, including a memory storing identification information identifying said radio frequency identification module; and wherein said radio frequency identification module being connectable to a processor of said electronic module, enabling said processor to respond to receipt by said input/output unit of an interrogation signal by applying to said input/output unit an identification signal based on said stored identification information for output of said identification signal to a source of goods or services.

2. A device as claimed in claim 1, wherein:

one of the parts has a recess in one surface thereof; and said radio frequency identification module is affixed within said recess.

3. A device as claimed in claim 2, wherein:

said radio frequency identification module is affixed in said recess with a solid fixing material.

4. A device as claimed in claim 2, wherein:

said radio frequency identification module is affixed in said recess with an adhesive.

5. A device cover as claimed in claim 2, comprising:

a recess cover affixed over said recess and said radio frequency identification module; and wherein said radio frequency identification module is positioned within said recess.

6. A device as claimed in claim 1, wherein said one of said parts adapted for attachment to said electronic module comprises:

a base portion; and a foil including said radio frequency identification module incorporated therein, said foil being affixed on a surface of said base portion.

7. A device as claimed in claim 1, wherein:

said radio frequency identification module is molded within said one of said parts adapted for attachment to said electronic module.

8. A device as claimed in claim 1, wherein:

said input/output unit comprises an antenna.

9. A device as claimed in claim 2, wherein said device comprises:

a recess cover for affixing said radio frequency identification module within the recess.

10. A device as claimed in claim 1, wherein said radio frequency identification module comprises:

a power source.

11. A device in accordance with claim 10 wherein said power source comprises:
a reactive circuit responsive to an electromagnetic field generated by the source of goods or services for storing energy obtained from the electro-magnetic field.

12. A device as claimed in claim 10, wherein:
said power source comprises a battery.

13. A device as claimed in claim 10, wherein:
said power source comprises a cover connector adapted for connection to a mating connector of the electronic module to provide power to said radio frequency identification module from said power source within the electronic module.

14. A device as claimed in claim 1, wherein:
said processor is further responsive to receipt by said input/output unit of transaction data to store said transaction data in said memory.

15. A device as claimed in claim 1, comprising:
a cover connector adapted for connection to a mating connector of said electronic module and wherein;
said processor is responsive to receipt by said input/output unit of transaction data to apply said transaction data to said cover connector for application through the mating connector for storage in a memory of the electronic module.

16. An electronic device, comprising:
first and second outer cover parts which enclose an electronic module and a radio frequency module by the parts fitting together;
the electronic module including a first processor, a first memory, a first input/output unit, and a first power source, said first processor, said first memory, and first input/output unit cooperating to perform an electronic function; and
a radio frequency identification module placed between the electronic module and one of said parts and incorporated within one of said parts, including a second processor, a second memory, a second input/output unit, and a second power source, said second memory storing identification information identifying said radio frequency identification module, said second processor being responsive to receipt by said second input/output unit of an interrogation signal to apply to said second input/output unit an identification signal based on said stored identification information for output of said identification signal to a source of goods or services; and wherein
said one of said parts being adapted for attachment to said electronic module to connect said radio frequency module to said electronic module.

17. An electronic device as claimed in claim 16, wherein;
one of the parts has a recess in one surface thereof; and
said radio frequency identification module is affixed within said recess.

18. An electronic device as claimed in claim 17, wherein:
said radio frequency identification module is affixed in said recess with a solid fixing material.

19. An electronic device as claimed in claim 17, wherein:
said radio frequency identification module is affixed in said recess with an adhesive.

20. An electronic device as claimed in claim 17, wherein:
a recess cover is affixed over said recess and said radio frequency identification module; and
said radio frequency identification module is positioned within said recess.

21. An electronic device as claimed in claim 16, wherein said cover member comprises:
a base portion; and
a foil having said radio frequency identification module incorporated therein, said foil being affixed on a surface of said base portion.

22. An electronic device as claimed in claim 16, wherein:
said radio frequency identification module is molded within one of said parts adapted for attachment to said electronic module.

23. An electronic device as claimed in claim 16, wherein:
said second input/output unit comprises an antenna.

24. An electronic device as claimed in claim 16, wherein:
said first power source comprises a battery; and
said second power source comprises a reactive circuit responsive to an electro-magnetic field generated by the source of goods or services for storing energy obtained from the electro-magnetic field.

25. An electronic device as claimed in claim 16 wherein:
said first power source comprises a battery; and
said second power source comprises a battery.

26. An electronic device as claimed in claim 16, wherein:
said electronic module further includes a module connector; and
said second power source comprises a cover connector connected to said module connector to provide power to said radio frequency identification module from said first power source.

27. An electronic device as claimed in claim 16, wherein:
said second processor is responsive to receipt by said second input/output unit of transaction information to store the transaction information in said second memory.

28. An electronic device as claimed in claim 27, wherein:
said cover member further includes a cover connector; and
said electronic module further includes a display device and a module connector connected to said cover connector, permitting passage of the transaction information through said cover connector and said module connector for display on said display device.

29. An electronic device as claimed in claim 28, wherein:
said electronic module further includes a control unit permitting control of operation of said radio frequency identification module.

30. An electronic device as claimed in claim 16, wherein:
said electronic module further includes a module connector;
said one of said parts further includes a cover connector connected to said module connector; and
said second processor is further responsive to receipt by said second input/output unit of transaction information to apply said transaction information to said cover connector for passage through said module connector and storage in said first memory.

31. An electronic device as claimed in claim 30, wherein:
said electronic device further includes a display device for display of said transaction information.

32. An electronic device as claimed in claim 30, wherein:
said electronic module further includes a control unit permitting control of operation of said radio frequency identification module.

33. An electronic device as claimed in claim 16, wherein:
the electronic module comprises a communication device.

34. An electronic device as claimed in claim 32, wherein: the communication device comprises a cellular telephone.

35. A system for authorizing providing of goods, said system comprising:
first and second outer cover parts which fit together to enclose an electronic module and a radio frequency module by the parts fitting together and an electronic device including (a) the electronic module which comprises a first processor, a first memory, a first input/output unit, and a first power source, said first processor, first memory, and first input/output unit cooperating to perform an electronic function; and (b) one of said parts being adapted for attachment to said electronic module and including therein the radio frequency identification module placed between the electronic module and one of the first and second outer cover parts, a second processor, a second memory, a second input/output unit, and a second power source, said second memory storing identification information identifying the radio frequency identification module, said second processor being responsive to receipt by said input/output unit of an interrogation signal to apply to said input/output unit an identification signal based on the stored identification information for output of the identification signal to a receiving device; and
a source of goods, including a third processor, a third memory, and a third input/output unit, said third processor causing said third input/output unit to output an interrogation signal, said third processor authoring providing of goods in response to receipt by said third input/output unit of an identification signal meeting a predetermined condition.

36. A system as claimed on claim 35, wherein:
one of the parts has a recess in one surface thereof; and
said radio frequency identification module is affixed in the recess.

37. A system as claimed in claim 36, wherein:
said radio frequency identification module is affixed in said recess with a solid fixing material.

38. A system as claimed in claim 36, wherein:
said radio frequency identification module is affixed in said recess with an adhesive.

39. A system as claimed in claim 36, wherein:
a recess cover affixed over said recess and said radio frequency identification module; and wherein
said radio frequency identification module is positioned within said recess.

40. A system as claimed in claim 35, wherein:
said one of said parts adapted for attachment to said electronic module comprises:
a base portion; and
a foil having said radio frequency identification module incorporated therein, said foil being affixed on a surface of said base portion.

41. A system as claimed in claim 35, wherein:
said radio frequency identification module is molded within said one of said parts adapted for attachment to said electronic module.

42. A system as claimed in claim 35, wherein said second input/output unit comprises:
an antenna.

43. A system as claimed in claim 35, wherein said second power source comprises:
a reactive circuit responsive to an electromagnetic field generated by the source of goods or services for storing energy obtained from the electro-magnetic field.

44. A system as claimed in claim 35, wherein said first and second power sources comprises:
a battery.

45. A system as claimed in claim 35, wherein:
said first power source comprises a battery;
said electronic module further includes a module connector; and
said second power source comprises a cover connector connected to said module connector to provide power to said radio frequency identification module from said first power source.

46. A system as claimed in claim 35, wherein:
said second processor is further responsive to receipt by said second input/output unit of transaction information to store the transaction information in said second memory.

47. A system as claimed in claim 46, wherein:
said one of said parts further includes a cover connector; and
said electronic module further includes a display device and a module connector connected to said cover connector, permitting passage of the transaction information through said cover connector and said module connector for display on said display device.

48. A system as claimed in claim 47, wherein:
said electronic module further includes a control unit permitting control of operation of said radio frequency identification module.

49. A system as claimed in claim 35, wherein:
said electronic module further includes a module connector;
said one of said parts being adapted for attachment to said electronic module further includes a cover connector connected to said module connector, and
said second processor is further responsive to receipt by said input/output unit of transaction information to apply said transaction information to said cover connector for application through said module connector and storage in said first memory.

50. A system as claimed in claim 49, wherein:
said electronic device includes a display device for display of transaction information.

51. A system as claimed in claim 50, wherein:
said electronic module includes a control unit permitting control of operation of said radio frequency identification module.

52. A system as claimed in claim 35, wherein the electronic module comprises:
a communication device.

53. A system as claimed in claim 52, wherein the communication device comprises:
a cellular telephone.

54. A system for authorizing providing of services, said system comprising:
first and second outer cover parts which enclose an electronic module and a radio frequency module by the parts fitting together and an electronic device including (a) the electronic module which comprises a first processor, a first memory, a first input/output unit, and a first power source, said first processor, first memory, and first input/output unit cooperating to perform an electronic function; and (b) one of said parts being adapted for attachment to said electronic module and including therein a radio frequency identification module placed between the electronic module and one of the first and second outer parts and, a second processor, a second memory, a second input/output unit, and a second power source, said second memory storing identification information identifying the radio frequency identification module, said second processor being responsive to receipt by said input/output unit of an interrogation signal to apply to said input/output unit an identification signal based on the stored identification information for output of the identification signal to a receiving device; and a source of goods, including a third processor, a third memory, and a third input/output unit, said third processor causing said third input/output unit to output an interrogation signal, said third processor authorizing providing of services in response to receipt by said third input/output unit of an identification signal meeting a predetermined condition.

55. A system as claimed in claim 54, wherein:

one of the parts has a recess in one surface thereof; and said radio frequency identification module is affixed within said recess.

56. A system as claimed in claim 55, wherein:

said radio frequency identification module is affixed in said recess with a solid fixing material.

57. A system as claimed in claim 55, wherein:

said radio frequency identification module is affixed in said recess with an adhesive.

58. A system as claimed in claim 55, wherein:

a recess cover affixed over said recess and said radio frequency identification module; and wherein
said radio frequency identification module is positioned within said recess.

59. A system as claimed in claim 54, wherein said one of said parts adapted for attachment to said electronic module comprises:

a base portion; and a foil having said radio frequency identification module incorporated therein, said foil being affixed on a surface of said base portion.

60. A system as claimed in claim 54, wherein:

said radio frequency identification module is molded within said one of said parts adapted for attachment to said electronic module.

61. A system as claimed in claim 54, wherein said second input/output unit comprises:

an antenna.

62. A system as claimed in claim 54, wherein:

said first power source comprises a battery; and said second power source comprises a reactive circuit responsive to an electromagnetic field generated by the source of goods or services for storing energy obtained from the electro-magnetic field.

63. A system as claimed in claim 54, wherein said first and second power sources comprises:

a battery.

64. A system as claimed in claim 54, wherein:

said electronic module further includes a module connector; and said second power source comprises a cover connector connected to said module connector to provide power to said radio frequency identification module from said first power source.

65. A system as claimed in claim 54, wherein:

said second processor is responsive to receipt by said input/output unit of transaction information to store the transaction information in said second memory.

66. A system as claimed in claim 65, wherein:

said one of said parts further includes a cover connector; and said electronic module further includes a display device and a module connector connected to said cover connector permitting passage of the transaction information through said cover connector and said module connector for display on said display device.

67. A system as claimed in claim 66, wherein:

said electronic module includes a control unit permitting control of operation of said radio frequency identification module.

68. A system as claimed in claim 54, wherein:

said electronic module includes a module connector, said one of said parts adapted for attachment to said electronic module further includes a cover connector connected to said module connector; and said second processor is further responsive to receipt by said input/output unit of transaction information to apply the transaction information to said cover connector for application through said module connector and storage in said first memory.

69. A system as claimed in claim 68, wherein:

said electronic device further includes a display device for display of transaction information.

70. A system as claimed in claim 69, wherein:

said electronic module further includes a control unit permitting control of operation of said radio frequency identification module.

71. A system as claimed in claim 54, wherein the electronic module comprises:

a communication device.

72. A system as claimed in claim 54, wherein the communication device comprises:

a cellular telephone.

* * * * *